April 10, 1951      J. W. ANDERSON      2,548,090
CONNECTION MEANS FOR A WINDSHIELD
WIPER BLADE AND ARM UNIT
Filed Sept. 23, 1947
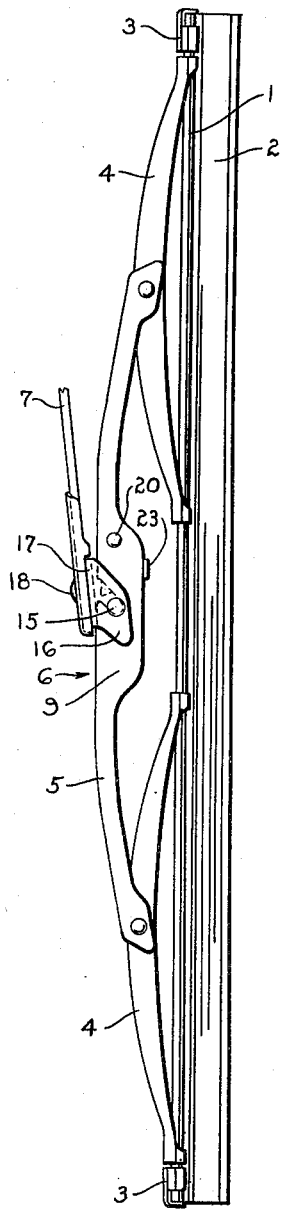
Fig.-1
Fig.-2
Fig.-3
Fig.-4
Fig.-5
INVENTOR.
JOHN W. ANDERSON
BY
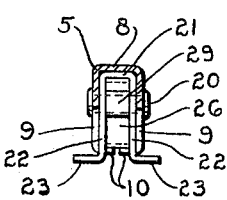
ATTORNEY Patented Apr. 10, 1951

2,548,090

UNITED STATES PATENT OFFICE 2,548,090

CONNECTION MEANS FOR A WINDSHIELD WIPER BLADE AND ARM UNIT

John W. Anderson, Gary, Ind., assignor to Productive Inventions, Inc., a corporation of Indiana Application September 23, 1947, Serial No. 775,595

8 Claims. (Cl. 15—250)

This invention relates generally to clasps or connection means and is particularly adapted for use in those installations where it is desirable to quickly detachably connect a pair of units or members together.

An important object of the invention is to provide simple and effective means by which one of the units may be locked securely to the other unit, the locking means being constructed and arranged to permit manual removal of one unit from the other.

The connection means of the present invention may be constructed as desired but is primarily directed to an arrangement which preferably includes entering means carried by one unit and means on another unit for receiving such means. More specifically in this respect, the receiving means is provided with an opening formed by a pair of notches or recesses within which the entering part is adapted to be seated, including yieldable means for holding the part therein.

A particular object of the invention is to provide receiving means of such a character that a variety of types of entering parts may be associated therewith.

Another object of the invention is to provide a receiving means of such a character that it will minimize the width of the unit with which it is incorporated.

A further object of the invention is to provide an elongated bridge member having unitary wall portions which are constructed and arranged to provide a housing for a latch mechanism.

An additional object of the invention is to provide an improved method of assembling the latch mechanism in the housing formed by the bridge member.

Other objects and advantages of the invention will become evident after considering the description hereinafter set forth in conjunction with the drawing annexed hereto.

In the drawing,

Figure 1 is a side view of a wiper blade assembly as applied to a wiper arm;

Figure 2 is an enlarged side view in elevation of a part of the assembly illustrated in Figure 1, portions of which are in section for the purpose of illustrating certain details of construction;

Figure 3 is a view similar to Figure 2, showing the yieldable holding means or latch mechanism in a retracted position and an entering part of a different character applied to the connection means;

Figure 4 is a front view of a portion of the assembly illustrated in Figure 2, the entering part being removed; and Figure 5 is a transverse section taken substantially on line 5—5 of Figure 2.

Referring to the drawings, particularly Figure 1, numeral 1 represents a flexible support for a wiper element 2. These are detachably secured together by a pair of clips 3 to constitute a unit. The extremities of a pair of links 4 are operatively connected to this unit, preferably slidably to the support 1, and the extremities of an elongated bridge member 5 are pivotally connected to the links 4. The bridge 5 is provided with connection means generally designated 6, preferably located at or adjacent to the center of the bridge. The arrangement is such that when the connection means 6 is secured to a wiper arm 7, the spring means associated with the latter serves to distribute a substantially uniform pressure along the entire or full length of the wiping element.

The present invention is directed primarily to the connection means 6 associated with the bridge member 5 and will now be described in detail.

The bridge 5 is preferably elongated, channel shape in cross-section and includes a continuous front wall 8 and continuous corresponding side walls extending the full length of the bridge. The side walls are widened as indicated at 9 and inturned at 10. These walls, among other things, form a generally rectangular housing or casing for a latch mechanism. Those portions of the bridge extending outwardly from the housing constitute arms, the ends of the latter being pivotally connected to the links 4 as clearly illustrated. The front wall of the bridge is preferably provided with a pair of openings 11 and 12, separated by an intermediate portion or abutment means 13. The widened side walls 9 are provided with corresponding notches 14 which intersect the opening 12, the notches being preferably inclined with respect to the front wall and constructed to pivotally receive an entering part 15. The entering part 15 may be designed and constructed as desired but is preferably made in the form of a cylindrical cross pin, the ends of which are anchored to the side walls 16 of a generally U-shaped fitting 17, the latter being pivotally connected at 18 to the arm 7 so that the blade assembly may be adjusted angularly with respect thereto.

A latch mechanism is arranged substantially within the confines of the housing or enlarged part of the bridge member for detachably holding the entering part 15 in the notches 14. The latch mechanism may be designed and constructed as desired but preferably includes a latch 19 pivotally connected to a cylindrical pivot 20 carried by the side walls 9 of the bridge. More specifically, the latch 19 is channel shape in character and includes a base wall 21, corresponding side walls 22, and finger portions 23 which project laterally outwardly beyond the side walls 9 of the bridge, as clearly illustrated in Figures 4 and 5. One extremity of the latch is preferably provided with a pair of corresponding marginal edge portions 24 and a pair of corresponding edge portions 25. The edge portions 24 are so constructed and arranged with respect to the notches 14 that the entering part 15 cannot be removed until released by manipulating the latch. A spring 26 is provided for normally maintaining the latch 19 in the locking position illustrated in Figure 2, with the base wall 21 thereof in engagement with the front or base wall portion 8 of the bridge. The edge portions 25 of the latch are adapted to engage the inturned wall portions 10 of the bridge for limiting the pivotal movement of the latch when retracted as depicted in Figure 3.

The spring 26 may be constructed as desired, but preferably is of the hairpin type, and includes a pair of leg portions 27 and 28 joined together by a generally round bight portion 29. As clearly illustrated by the full lines in Figure 2, the bight portion is mounted on the pivot 20 and the ends of the legs are arranged to bear or slide against the base wall 21 of the latch and the inturned walls 10 of the bridge, respectively. The spring prior to being assembled normally assumes the position indicated by the dotted lines in Figure 2. To assemble the spring it is merely necessary to press the legs toward each other, insert them into the latch, and then force the bight portion 29, which has been contracted by pressing the legs together, into snapping relation with the pivot 20. The free end of the leg 27 may be provided with a rounded portion 30 to assist in piloting the spring into the proper position.

To connect the complete wiper blade assembly to the wiper arm, the two are brought together so that the entering part 15 will engage the strike portion 31, forming a part of the base wall 21 of the latch, to pivot or retract the latch, as illustrated in Figure 3, and when the entering part is properly received in the notches, the latch will snap back into the holding position illustrated in Figure 2. The finger portions 23 of the latch may be manually engaged to swing the latch to the position illustrated in Figure 3 to release the entering part.

As clearly illustrated in Figure 3, an entering part 32 of a different character is attached to a fitting carried by a wiper arm. The entering part 32 is preferably made in the form of a hook so that portions thereof may be arranged in the openings 11 and 12 to receive the intermediate portion 13 of the bridge to provide an operative detachable connection between the complete wiper blade assembly and the arm. Irrespective of the type of entering part employed, the arrangement is such that the complete wiper blade assembly may pivot or freely laterally adjust itself with respect to the arm so that the entire length of the wiping element will engage the surface to be cleaned. It will also be evident in view of the disclosure that the yieldable holding means or latching mechanism performs the dual function of detachably holding either of two types of entering parts carried by the wiper arms with respect to the housing or channel of the connector.

In addition to the foregoing, attention is directed to the fact that any desirable means may be employed for connecting the extremities of the bridge to the links, but as illustrated pivots are preferably provided, the ends of the pivots projecting laterally with reference to the bridge for reception in holes provided therefor in the links.

Reference is made to two prior co-pending applications in the name of John W. Anderson, Serial Nos. 634,729 and 634,730, filed December 13, 1945. The inventions disclosed and claimed in the said co-pending applications are directed to wiper blade assemblies and pressure distributing devices therefor whereas the invention defined in the subject application is for a connector for establishing a detachable connection between a pressure distributing device and a wiper arm.

I have described what I believe to be the best embodiment of my invention. I do not wish, however, to be confined to the embodiment shown, but what I desire to cover by Letters Patent is set forth in the appended claims.

I claim:

1. A connector for use in establishing an operative connection between windshield wiper arm units and a wiper blade unit comprising a channel housing having a pair of side walls and an outer connecting base wall, notches extending inwardly from the outer portions of the side walls of the channel housing forming a recess for receiving a transverse entering part carried by one wiper arm unit, said base wall of the channel housing being formed to provide a bridge portion for reception in a curved entering part provided on another wiper arm unit, and yieldable holding means arranged substantially within the confines of the housing structurally related to said notches and said bridge portion for detachably holding the transverse entering part in the notches or for engaging the curved entering part so as to assist the latter in detachably holding the bridge portion therein.

2. In a windshield wiper device, a wiper blade unit, a connector carried by the blade unit and comprising a channel housing, said channel housing having an outer wall of substantial length and a pair of integral side walls inturned toward said blade unit, notches provided in the side walls of the channel housing for receiving a transverse entering part carried by one wiper arm unit, said outer wall of the channel housing being formed to provide abutment means for reception in a curved entering part provided on another wiper arm unit, and yieldable holding means arranged substantially within the confines of the housing structurally related to said notches and said abutment means for detachably holding the transverse entering part in the notches or for engaging the curved entering part so as to assist the latter in detachably holding the abutment means therein.

3. In a windshield wiper device, a wiper blade unit, a connector carried by the blade unit and comprising a channel housing, said channel housing having an outer wall of substantial length and a pair of side walls inturned toward the blade unit, notches provided in the side walls of the channel housing for receiving a transverse entering part carried by one wiper arm unit, said channel housing being provided with abutment means for reception in a hook entering part provided on another wiper arm unit, said outer wall being provided with apertures through which the hook entering part is adapted to extend when receiving the abutment means, and yieldable holding means arranged substantially within the confines of the housing structurally related to said notches and said abutment means for detachably holding the transverse entering part in the notches or for engaging the hook entering part so as to assist the latter in detachably holding the abutment means therein.

4. A connector for use in establishing an operative connection between a windshield wiper arm unit and a wiper blade unit comprising a housing having an outer wall and a pair of side walls, notches provided in the side walls of the housing for receiving a transverse entering part carried by one wiper arm unit, said housing being provided with abutment means for reception in a hooked entering part provided on another wiper arm unit, said outer wall having a pair of apertures therein through which the hooked entering part is adapted to extend when receiving the abutment means, and yieldable holding means arranged substantially within the confines of the housing structurally related to said abutment means and said notches in a manner whereby the yieldable holding means will assist in causing the hooked entering part to embrace the abutment means or detachably hold the transverse entering part in the notches when the hooked entering part is not in use.

5. A connector for use in establishing an operative connection between windshield wiper arm units and a wiper blade unit comprising a channel housing having a pair of side walls and an outer connecting base wall, notches extending inwardly from the outer portions of the side walls of the channel housing forming a recess for receiving a transverse entering part carried by one wiper arm unit, said base wall of the channel housing being formed to provide a bridge portion for reception in a curved entering part provided on another wiper arm unit, pivot means carried by the side walls of the channel housing, a latch and a spring carried by the pivot means, said spring having a portion bearing against the housing and a portion against the latch, and said latch being pivotally movable about the pivot means and structurally related to said notches and said bridge portion for detachably holding the transverse entering part in the notches or for engaging the curved entering part so as to assist the latter in detachably holding the bridge portion therein.

6. A connector for a windshield wiper blade unit, said connector comprising a channel housing, arms carried by and extending outwardly for considerable distances from the ends of the channel housing for attaching the channel housing to a wiper blade unit, said channel housing having an outer wall of substantial length and a pair of integral inturned side walls, notches provided in the side walls of the channel housing for receiving a transverse entering part carried by one wiper arm unit, said outer wall of the channel housing being formed to provide abutment means for reception in a curved entering part provided on another wiper arm unit, and yieldable holding means arranged substantially within the confines of the housing structurally related to said notches and said abutment means for detachably holding the transverse entering part in the notches or for engaging the curved entering part so as to assist the latter in detachably holding the abutment means therein.

7. In a windshield wiper device, a wiper blade unit, a connector carried by the blade unit and comprising a channel housing, said channel housing having an outer wall of substantial length and a pair of side walls inturned toward the blade unit, notches provided in the side walls of the channel housing for receiving a transverse entering part carried by one wiper arm unit, a first aperture provided in the outer wall intersecting the notches, a second aperture provided in the outer wall spaced from the first aperture so that the material in said wall between the apertures forms an abutment means, said apertures permitting a hook entering part provided on another wiper arm unit to extend therethrough when receiving the abutment means, and yieldable holding means arranged substantially within the confines of the housing structurally related to said notches and said abutment means for detachably holding the transverse entering part in the notches or for engaging the hook entering part so as to assist the latter in detachably holding the abutment means therein.

8. A connector for use in establishing an operative connection between a windshield wiper arm unit and a wiper blade unit comprising a housing having an outer wall and a pair of side walls, notches provided in the side walls of the housing for receiving a transverse entering part carried by one wiper arm unit, said housing being provided with abutment means for reception in a hooked entering part provided on another wiper arm unit, said outer wall having a pair of apertures therein through which the hooked entering part is adapted to extend when receiving the abutment means, a cross-pin secured to the side walls of the housing, a latch pivotally mounted on the cross-pin, a spring urging the latch to engage the outer wall of the housing to normally block entrance of either of the said forms of entering parts into one of said apertures, and said latch being arranged substantially within the confines of the housing and structurally related to said abutment means and said notches in a manner whereby the latch will assist in causing the hooked entering part to embrace the abutment means or detachably hold the transverse entering part in the notches when the hooked entering part is not in use.

JOHN W. ANDERSON.

REFERENCES CITED

The following references are of record in the file of this patent:

UNITED STATES PATENTS

| Number | Name | Date |
|---|---|---|
| 973,173 | Comeau | Oct. 18, 1910 |
| 1,110,368 | Young | Sept. 15, 1914 |
| 1,456,316 | Kritz | May 22, 1923 |
| 1,475,625 | Folberth | Nov. 17, 1923 |
| 1,510,509 | Stadeker | Oct. 7, 1924 |
| 1,778,256 | Hueber | Oct. 14, 1930 |
| 1,947,185 | Browett | Feb. 13, 1934 |
| 2,153,224 | Zaiger | Apr. 4, 1939 |
| 2,156,506 | Marcolivio | May 2, 1939 |
| 2,170,939 | Christen | Aug. 29, 1939 |
| 2,234,709 | Rodrick | Mar. 11, 1941 |
| 2,276,556 | Zaiger | Mar. 17, 1942 |
| 2,303,694 | Horton | Dec. 1, 1942 |
| 2,432,693 | Anderson | Dec. 16, 1947 |

FOREIGN PATENTS

| Number | Country | Date |
|---|---|---|
| 433,467 | Great Britain | Acc. Aug. 15, 1935 |